Nov. 14, 1944.　　　R. R. LOBOSCO　　　2,362,569
AUTOMATIC ELECTRIC CONTROL SYSTEM
Filed Jan. 27, 1943

INVENTOR
ROSCOE R. LOBOSCO
BY
ATTORNEY

Patented Nov. 14, 1944

2,362,569

UNITED STATES PATENT OFFICE 2,362,569

AUTOMATIC ELECTRIC CONTROL SYSTEM

Roscoe R. Lobosco, Elizabeth, N. J., assignor to The Linde Air Products Company, a corporation of Ohio Application January 27, 1943, Serial No. 473,679

8 Claims. (Cl. 314—71)

This invention relates to automatic electric control systems, and more particularly to automatic means for maintaining the proper rate of electrode feed in an automatic welding machine. For conciseness, the invention will be described with particular reference to its application in the control of machines used for welding by the process described in United States Patent No. 2,043,960, although this is but one example of its use.

In automatic electric welding machines of the type in which metal is caused to be melted from a filler metal electrode and deposited on and coalesced with molten metal of a workpiece by an electrical discharge between the metal electrode and the workpiece while relative movement between the electrode and workpiece is caused to take place, important requirements for the production of uniformly satisfactory welds are that the distance between the fusing end of the electrode and the workpiece and the rate of electrode feed be maintained at the desired values during the welding operation. Variation in the distance between the fusing end of the electrode and the workpiece results in variation in the welding voltage, and undue fluctuations in the welding voltage cause non-uniform welding. Generally, the electrode is caused to be fed to the workpiece by driving rolls actuated by an electric motor, and the rate of electrode feed is controlled by controlling the speed of the motor.

Heretofore, the conventional means for maintaining the desired rate of electrode feed, such as that used in electric welding machines wherein, as disclosed in Patent No. 2,043,960, welding takes place through a molten pool of an initially comminuted mineral-like welding composition and under a deep blanket of unfused welding composition, employed electronic tubes, such as thyratrons, diode rectifiers, and the like, together with complicated and costly associated circuits and apparatus. The electronic tubes and some of the associated apparatus, such as electrolytic condensers, have a definitely limited life in normal service, are subject to variations due to aging, temperature change and the like, and are readily damaged by electrical or mechanical abuse.

The main objects of the invention, therefore, are to provide an automatic electric control system that is not subject to such disadvantages; and improved means for maintaining the proper rate of electrode feed in an automatic welding machine. These objects are attained by the use of a relatively simple control circuit in which the elements have an indefinitely long life and excellent stability with regard to aging, temperature changes, and the like, and which are not easily damaged through electrical or mechanical abuse.

According to the invention, an automatic electric control system is provided, which includes a saturable reactor having an input circuit and an output circuit. Current is caused to flow through such input circuit so that the value of the current varies in accordance with the value of an electrical characteristic to be controlled, and the output circuit of the saturable reactor is so connected to a source of current for controlling such electrical characteristic that the latter is maintained at a substantially constant predetermined value by virtue of the operation of the saturable reactor.

More particularly, in accordance with the invention, an automatic electric control system is provided for maintaining at a substantially constant value the alternating current welding voltage between a welding electrode and the work toward which such electrode is being fed by an alternating current motor. The system includes a rectifier having an alternating current input circuit and a direct current output circuit, the rectifier input circuit being connected across the electrode and the work. The system also includes a source of bucking voltage, a control network including an adjustable resistor and condenser, and a saturable reactor having a direct current winding and an alternating current winding, the direct current winding, adjustable resistor and source of bucking voltage being connected in series circuit relation with the rectifier output circuit, and the condenser being connected in parallel circuit relation with the rectifier output circuit. A rheostat is connected across the alternating current winding which is in turn connected in speed controlling circuit relation with the electrode feed motor and a source of alternating current. An electronic or magnetic amplifier may be inserted between the welding circuit and the saturable reactor, and more than one stage of amplification may be used if necessary.

Referring to the drawing.

Figure 3:
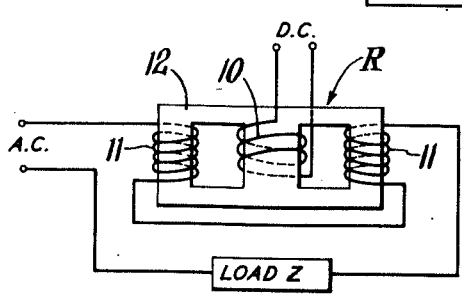
Fig. 3 is a schematic diagram of a saturable reactor.

The basic control element employed in the automatic electric control system of the present invention is a saturable reactor. The following description of the manner in which the saturable reactor operates will aid in understanding its purpose in the control circuits which are described in detail below:

Fig. 3 shows a saturable reactor R connected so as to control the power to a load Z. In the usual construction, the direct current coil 10 and alternating current coils 11, 11 are wound on a three-legged laminated silicon steel core 12. The alternating current coils 11 are usually wound on the two outer legs of the iron core, for an equal number of turns, and are connected in series with each other and the load Z. The direct current coil 10 is wound on the center leg of the core and is used as the control winding. With no current flowing in the direct current winding 10, the alternating current coils 11 form a reactor whose impedance is roughly determined by the number of turns in the alternating current coils and by the physical dimensions of the iron in the core. When current flows through the direct current coil, the resultant magnetic flux in the iron core makes the latter less receptive to additional flux from the alternating current windings and thus reduces the impedance of the alternating current windings and results in more current flowing through the load Z. The greater the value of current in the direct current winding 10, the more the silicon steel core 12 is saturated, and the lower the impedance of the alternating current coils 11. Thus, by varying the value of the current in the direct current winding, it is possible to vary the value of the current in the alternating current circuit. The controlled power in the alternating current circuit is usually many times greater than the controlling power in the direct current circuit.

Figure 1:
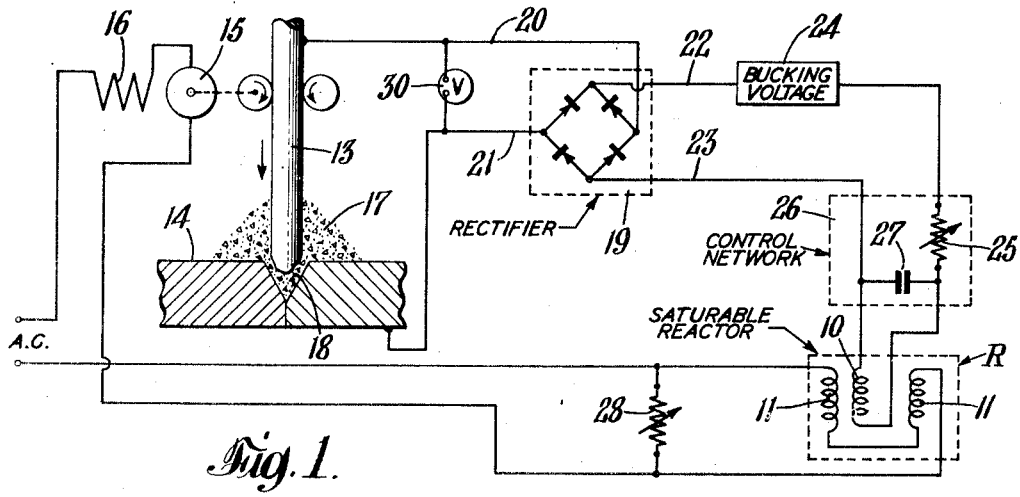
Fig. 1 is a circuit diagram of an automatic electric control system exemplifying the invention.
Figure 2:
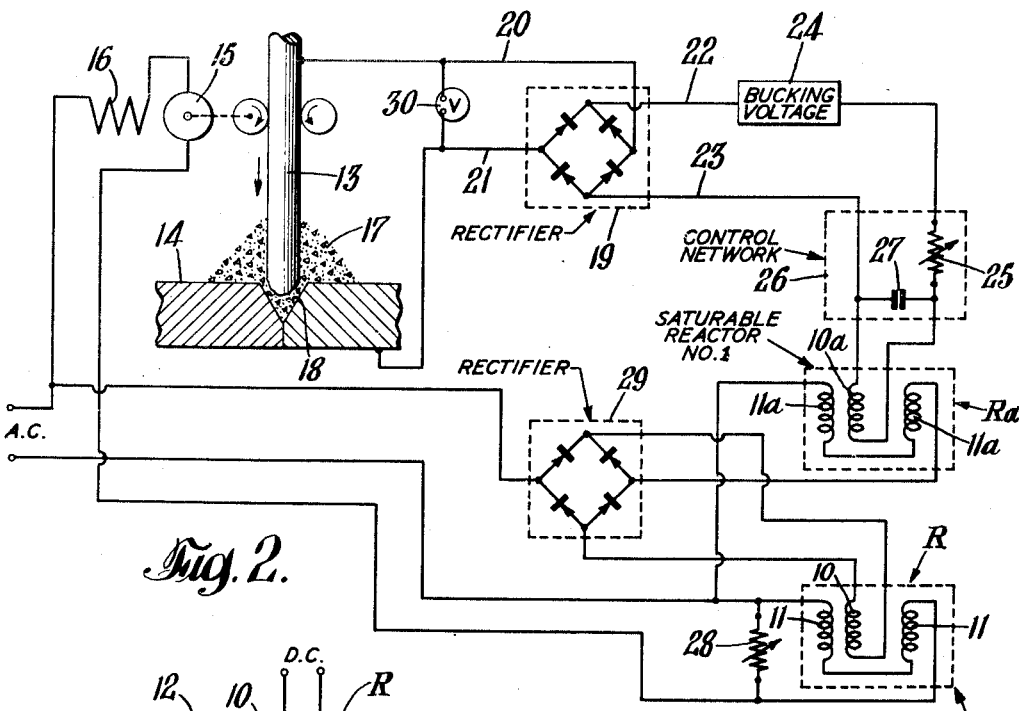
Fig. 2 is a circuit diagram of a modification of the control system illustrated in Fig. 1.

The application of the control system of the invention to an automatic electric welding machine for welding by the process disclosed in Patent No. 2,043,960 is illustrated in Figs. 1 and 2 of the drawing.

Referring particularly to Fig. 1, a welding rod 13 is fed toward work 14 to be welded, by an alternating current motor 15 having a series field winding 16. The rod feed motor 15 is energized by a suitable source of alternating current. The lower end of the rod 13 is covered by a blanket 17 of granulated welding composition during the welding operation, metal being melted from the rod 13 and deposited through a subsurface pool of molten welding composition onto the work 14. An automatic mechanism (not shown) moves the rod 13 longitudinally of the welding groove 18 in the work 14 as welding progresses. The electrode 13 and the work 14 are included in an alternating current welding circuit (not shown) in a well-known manner.

A rectifier 19 has an input circuit 20, 21 connected across the welding rod 13 and the work 14, the welding voltage between the rod 13 and work 14 being thereby applied to the input circuit of the rectifier 19. A bridge-connected selenium, copper oxide, or other dry plate rectifier is recommended as being most suitable. Of course, where the welding current is direct it is not necessary to use a rectifier.

The rectifier 19 has an output circuit 22, 23 which includes in series circuit relation a source of bucking voltage 24, a variable resistor 25 of a control network 26 and the direct current winding 10 of the saturable reactor R. Thus, the rectified alternating current derived from the welding circuit is opposed by the bucking voltage of the source 24. The purpose of such bucking voltage is to prevent flow of current in the direct current winding 10 of the saturable reactor R until the welding voltage is just below a desired value. The bucking voltage source 24 may be omitted in some cases, but in general, the use of a bucking voltage makes the control circuit more sensitive to small changes in the welding voltage values than the circuit would be where a bucking voltage is not used.

A voltmeter 30 is connected between the welding rod 13 and the work 14, to indicate the welding voltage so that adjustments can be made to obtain and maintain the desired value of welding voltage.

The control network 26, shown in Fig. 1, includes the variable resistor 25 and a condenser 27. The purpose of the resistor 25 is to adjust the circuit to a desired operating voltage. Under certain circumstances it might be desirable or necessary to use some other type of control such as a variable impedance in place of the simple adjustable series resistance 25. The condenser 27 is connected in shunt circuit relation with the direct current winding 10 and serves to smooth out pulsations so that a steady current flows through such winding.

The alternating current coils 11, 11 of the saturable reactor R are connected in series with the windings of the rod feed motor 15 and the source of alternating current power which energizes such windings. The alternating current windings 11, 11 of the saturable reactor are shunted by a variable resistor 28, the purpose of which is to by-pass enough current around the alternating current windings 11 to energize the rod feed motor 15 to run at a speed which is lower than the speed necessary to maintain the desired value of welding voltage between the rod 13 and the work 14. Thus, the saturable reactor R handles only the controlling part of the motor current rather than the whole motor current. While the rod feed motor 15 is shown as a series motor, any motor whose speed can be varied by varying the power to one of its windings might be used.

The operation of the automatic electric control system shown in Fig. 1 is as follows: assuming that the desired welding voltage value is 25 volts, the source of bucking voltage 24 is set to produce a bucking voltage of 23 volts. Since the rod feed motor 15 is running at a speed slower than that which is necessary to maintain the desired 25 volts between the rod 13 and the work 14, the distance between the end of the rod 13 and the work 14 will continue to increase until the welding voltage exceeds the bucking voltage. When the welding voltage does exceed the bucking voltage, current will flow through the direct current winding 10 of the saturable reactor R and its value will continue to increase as long as the value of the welding voltage increases. The current through the direct current winding 10 of the saturable reactor results in more current flowing through the windings of the motor 15, and the speed of the rod feed motor 15 is thus increased. Should it be found that the rod feed motor 15 is maintaining the welding voltage at a value of 24 volts, for example, a readjustment of the variable resistor 25 will bring the welding voltage to the desired value, in this case 25 volts. Thus, the electric control system automatically operates so that any change from the desired value of welding voltage will cause a change in the motor current in a manner which will tend to maintain the welding voltage at a predetermined constant value.

If in practice it should be found that the simple circuit of Fig. 1 is not sensitive enough to maintain the welding voltage within the close limits which may be necessary in certain cases, an electronic or magnetic amplifier may be inserted between the welding circuit and the saturable reactor R. More than one stage of amplification may be used, if necessary.

Fig. 2 of the drawing shows a stage of magnetic amplification inserted between the welding circuit and the saturable reactor R, which controls the rod feed motor 15. The amplifier stage comprises a saturable reactor Ra having a direct current winding 10a and alternating current windings 11a, 11a. The reactor Ra is connected and operates in the same manner as the reactor described above in connection with the circuit of Fig. 1, except that the output of the saturable reactor Ra instead of directly going to the rod feed motor 15 is rectified by a rectifier 29 and flows through the direct current winding 10 of the saturable reactor R. This results in a much greater change in power to the rod feed motor 15 for a given change in the value of the welding voltage than would be the case where no amplifier is used and, therefore, operates to maintain the welding voltage to within closer limits than would be the case where no amplifier is used.

In the operation of the automatic electric control system shown in Fig. 2, the rectifier 19 derives a direct current component from the blanketed electric welding circuit, the value of which varies in accordance with the value of the welding voltage between the welding rod 13 and the work 14, toward which such rod is being fed by the feed motor 15. Such direct current component is transmitted to the direct current winding 10a of saturable reactor Ra and causes, in the manner described above, an amplified alternating current component to be produced in the alternating current windings 11a, 11a of the reactor Ra. The resulting amplified alternating current component produced by the windings 11a, 11a is rectified by the rectifier 29 and controls the speed of the motor 15 through the operation of the saturable reactor R. Thus, the speed of the rod feed motor 15 is changed in accordance with a change in the value of the welding voltage so as to maintain the latter at a substantially constant predetermined value, as described above in connection with Fig. 1.

The amount of power removed from the electrode circuit for use in the control circuit of the present invention is negligible. For example, if two amperes are removed and used in the control circuit, the latter is used to control the speed of a half horse power rod feed motor. Two amperes removed from a 200 ampere welding circuit, for example, has no appreciable effect on the welding action.

The output of the saturable reactor may be applied to the welding rod feed motor in any desirable manner. For example, the output of the reactor may be applied directly to a series motor as shown in the drawing, the output may be applied to one winding of an induction or torque motor, the output may be rectified and used to supply either or both the field or armature windings of a direct current shunt motor, or the output may be rectified and applied to the differential winding of a direct current motor.

While a bucking voltage circuit is shown inserted between the rectifier and saturable reactor, alternatively an alternating current bucking voltage circuit may be inserted between the welding circuit and the rectifier, in which case the alternating current bucking voltage should be properly phased to accomplish its purpose and be of the same frequency as that of the welding arc.

What I claim is:

1. An automatic electric control system comprising, in combination, means for deriving from a welding circuit a component the value of which varies in accordance with a welding characteristic that is to be controlled, means including a saturable reactor for amplifying said component, and means including a saturable reactor for utilizing said amplified component to control said characteristic whereby the latter is maintained at a substantially constant predetermined value.

2. An automatic electric motor control system including a saturable reactor having an input circuit and an output circuit; said input circuit including a rectifier circuit connected across an alternating current circuit the voltage of which is inversely responsive to the speed of a series motor, a control network connected to said rectifier circuit, a source of bucking voltage connected between said rectifier circuit and control network, and a direct current winding in said saturable reactor connected to said control network; said control network including a variable resistor for adjusting the input circuit to a desired operating voltage, and a condenser connected in shunt with said direct current winding to smooth out pulsations so that a steady current flows through said direct current winding; rectified current derived from such alternating current circuit being opposed by said source of bucking voltage to prevent flow of current in said direct current winding until the voltage of such alternating current circuit is just below a desired value, making the control system highly sensitive to small changes in such voltage; and said output circuit including an alternating current winding in said saturable reactor adapted to be connected in series circuit relation with a source of alternating current and such series motor, and a rheostat connected across said alternating current winding so as to by-pass enough current to energize such motor to run at a speed which is lower than that necessary to maintain at desired value the voltage of such alternating current circuit; the control system thus operating automatically to vary the speed of such motor to maintain substantially constant the voltage of said alternating current circuit.

3. An automatic electric control system for maintaining at a substantially constant value the alternating current voltage between an electrode and a member toward which such electrode is being fed by an alternating current motor, said system comprising, in combination, a rectifier having an alternating current input circuit and a direct current output circuit; means for connecting said rectifier input circuit across said electrode and said member; a source of bucking voltage; a control network including an adjustable resistor and a condenser; a saturable reactor having a direct current winding and an alternating current winding; said direct current winding, adjustable resistor and source of bucking voltage being connected in series circuit relation with said rectifier output circuit, and said condenser being connected in parallel circuit relation with said rectifier output circuit; a rheostat connected across said alternating current winding; and means for connecting said alternating current winding in speed controlling circuit relation with said motor and a source of alternating current.

4. An automatic electric control system comprising, in combination, means for deriving a direct current component from a blanketed electric welding circuit the value of which varies in accordance with the value of the welding voltage between a welding rod and the work toward which such rod is being fed by a feed motor; means for amplifying said current component including a saturable reactor having a direct current winding and an alternating current winding, and means for rectifying the resulting amplified alternating current component produced by said alternating current winding; and means for controlling the speed of said motor in accordance with the value of said rectified current component including another saturable reactor having a direct current winding through which said rectified current component flows, and an alternating current winding the current through which is controlled by said rectified current component to change the speed of said feed motor in accordance with a change in the value of the welding voltage so as to maintain the latter at a substantially constant predetermined value.

5. An automatic electric control system comprising, in combination, means for deriving a direct current component from a blanketed electric welding circuit the value of which varies in accordance with the value of the welding voltage between a welding rod and the work toward which such rod is being fed by an alternating current series motor; and means for controlling the speed of said motor in accordance with the value of said current component including a saturable reactor having a direct current winding through which said current component flows, and an alternating current winding the value of the current through which is controlled by said rectified current component to change the speed of said series motor in accordance with a change in the value of the welding voltage so as to maintain the latter at a substantially constant predetermined value.

6. An automatic electric control system comprising, in combination, a series wound alternating current motor, a saturable reactor having an alternating current circuit and a direct current circuit, means for connecting said alternating current circuit and said motor in series circuit relation with a source of alternating current power for energizing said motor, a variable resistor connected in shunt circuit relation with said alternating current winding for setting the minimum speed of said motor, said variable resistor acting to by-pass enough current to energize said motor to run at a selected minimum speed, and means acting to increase and regulate the speed of said motor comprising means for connecting said direct current winding to a source of direct current, and means acting to increase the value of said direct current when said motor operates at said minimum speed, decreasing the impedance of said alternating current circuit, with the result that the speed of said motor is increased to compensate for the increase in value of said direct current, the value of current flowing through said alternating current circuit controlling the speed of said motor above the selected minimum value which is dependent upon the resistance at which said variable resistor is adjusted, so that the control system operates automatically to maintain substantially constant the speed of said motor irrespective of torque variations.

7. An automatic electric control system comprising in combination, a saturable reactor including a direct current winding and a pair of alternating current windings, means for connecting said alternating current windings in series circuit relation with a source of alternating current, a variable resistor connected in shunt circuit relation with said alternating current windings to by-pass a certain amount of current around said windings, means for connecting said alternating windings to a device to be controlled so that the value of the current flowing through said alternating current windings controls a characteristic of said device above a minimum value which is dependent upon the resistance at which said variable resistor is adjusted, the current by-passed through said variable resistor energizing such device to produce such minimum value of said characteristic, and means for energizing said direct current winding with direct current the value of which is inversely proportional to said characteristic of said device above said minimum value, the operation of said system being such that the value of the direct current flowing through said direct current winding controls the value of the alternating current flowing through said alternating current windings which in turn controls said characteristic of said device above said minimum value, so that the control system operates automatically to maintain substantially constant a selected value of said characteristic.

8. An automatic electric control system for maintaining at a substantially constant value the alternating current welding voltage between a welding electrode and the work toward which such electrode is being fed by a series wound alternating current motor, said system comprising, in combination, a saturable reactor including a direct current winding and a pair of alternating current windings, means for causing a direct current to flow through said direct current winding which is directly proportional to such welding voltage above a predetermined value, and means connecting said alternating current windings in series circuit relation with such series motor and a source of alternating current power for energizing such motor so that the speed of the latter above a predetermined value is controlled by the value of direct current flowing through said direct current winding, the construction and arrangement being such that any change in such welding voltage automatically changes the speed of such motor so as to keep such voltage at a predetermined value by virtue of the automatic operation of said saturable reactor.

ROSCOE R. LOBOSCO.